United States Patent
Hecht et al.

(10) Patent No.: US 10,148,701 B1
(45) Date of Patent: Dec. 4, 2018

(54) AUTOMATIC DEVELOPMENT AND ENFORCEMENT OF LEAST-PRIVILEGE SECURITY POLICIES

(71) Applicant: CyberArk Software Ltd., Petach-Tikva (IL)

(72) Inventors: Asaf Hecht, Tel Aviv (IL); Tal Kandel, Pardes Hana Karkur (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/974,056

(22) Filed: May 8, 2018

(51) Int. Cl.
*H04L 29/06* (2006.01)
*G06F 9/455* (2018.01)

(52) U.S. Cl.
CPC ............ *H04L 63/205* (2013.01); *G06F 9/455* (2013.01)

(58) Field of Classification Search
CPC ............................. H04L 63/205; G06F 9/455
See application file for complete search history.

(56) References Cited

U.S. PATENT DOCUMENTS

| | | | | |
|---|---|---|---|---|
| 6,920,455 B1* | 7/2005 | Weschler | .......... | G06F 17/30286 |
| 7,185,192 B1* | 2/2007 | Kahn | .................. | G06F 21/6218 |
| | | | | 707/999.003 |
| 9,098,675 B1* | 8/2015 | Roth | ....................... | G06F 21/00 |
| 9,264,449 B1* | 2/2016 | Roth | ..................... | H04L 63/102 |
| 2007/0143827 A1* | 6/2007 | Nicodemus | ......... | G06F 21/6218 |
| | | | | 726/2 |
| 2014/0282825 A1* | 9/2014 | Bitran | ..................... | G06F 21/00 |
| | | | | 726/1 |
| 2014/0359695 A1* | 12/2014 | Chari | ..................... | H04L 63/20 |
| | | | | 726/1 |

* cited by examiner

*Primary Examiner* — Baotran N To
(74) *Attorney, Agent, or Firm* — Finnegan, Henderson, Farabow, Garrett & Dunner LLP

(57) ABSTRACT

Techniques include identifying permission polices corresponding to a plurality of identities in a network environment, the permission polices specifying what types of actions the plurality of identities are permitted to take with respect to particular network resources; analyzing information describing activity associated with a first identity from the plurality of identities in the network environment; and automatically developing, based on the analysis of the information, a least-privilege profile for the first identity, the least-privilege profile including permissions corresponding to the particular actions with respect to the particular network resources and excluding permissions that do not correspond to the particular actions with respect to the particular network resources.

27 Claims, 9 Drawing Sheets

AUTOMATIC DEVELOPMENT AND ENFORCEMENT OF LEAST-PRIVILEGE SECURITY POLICIES

BACKGROUND

Cloud computing technologies are broadly applicable in many technological fields. As a result, many organizations worldwide are using cloud technologies, such as AMAZON WEB SERVICES, MICROSOFT AZURE, and others. Reliance on a cloud computing implementation of an application architecture can reduce development times and development costs, while increasing the flexibility and scalability of applications. But cloud computing implementations add a new layer of security risks. A cloud-based infrastructure can be made up of many individual roles, users, services, machines, and other identities. Some privileged identities will be capable of making substantial changes to the cloud infrastructure, for example accessing sensitive protected data. These privileged entities must be secured, and the principle of least-privilege is one potential way of effectively doing so.

Current approaches for implementing cloud and privilege assignments are not user friendly and pose security risks. As a result, organizations often employ simple permission policies that give entities more permissions than they need, for example by granting the same permissions across entities sharing a group. Such permission policies enable attackers to easily move laterally and escalate privileges within the environment. Further, in some organizations, once privileges are granted to an identity, they are never revoked, even after the identity ceases using or needing the privileges. This also poses security risks, since it results in identities having more privileges than needed.

Consequently, systems and methods are required for automatically implementing a least-privilege model in an environment and for incentivizing organizations to maintain and implement a secure permissions policy. Such systems and methods can enable automatic determination of the most privileged identities in the network environment. These identities can then be targeted for additional management and protection.

SUMMARY

The disclosed embodiments describe non-transitory computer readable media and methods for developing and enforcing least-privilege policies in a network environment. For example, in an exemplary embodiment, there may be a non-transitory computer readable medium including instructions that, when executed by at least one processor, cause the at least one processor to perform operations for developing and enforcing least-privilege policies in a network environment. The operations may comprise identifying permission polices corresponding to a plurality of identities in a network environment, the permission polices specifying what types of actions the plurality of identities are permitted to take with respect to particular network resources. The operations may also comprise analyzing information describing activity associated with a first identity from the plurality of identities in the network environment, the activity including particular actions with respect to particular network resources. Further, the operations may comprise automatically developing, based on the analysis of the information, a least-privilege profile for the first identity, the least-privilege profile including permissions corresponding to the particular actions with respect to the particular network resources and excluding permissions that do not correspond to the particular actions with respect to the particular network resources. The operations may also comprise enforcing the least-privilege profile for the first identity.

The activity may be associated with the first identity on at least one of the bases of the activity is historical activity of the first identity, the activity is identified based on source code of an application associated with the first identity, or the activity is associated with a second identity determined to be similar to the first identity. The enforcement of the least-privilege profile for the first entity may include at least one of permitting the first identity to take actions based on the included permissions, disallowing the first identity to take actions based on the excluded permissions, conditioning the ability of the first identity to take actions based on the excluded permissions, or simulating an application of the least-privilege profile to actions taken by the first identity.

According to a disclosed embodiment, the operations may further comprise automatically generating a permissions matrix to enable visualization of the least-privilege profile for the first identity.

According to a disclosed embodiment, the operations may further comprise making the permissions matrix available in a shared environment for interactive use by a plurality of administrator identities.

According to a disclosed embodiment, the operations may further comprise providing an incentive for an administrator identity to exclude permissions from the least-privilege profile for the first identity.

According to a disclosed embodiment, identifying the permission policies may include querying, via an application programming interface, an identity management service.

According to a disclosed embodiment, the identifying the permission policies may include querying a permissions matrix associated with the plurality of identities, the permissions matrix defining the types of actions that the plurality of identities are permitted to take with respect to the particular network resources.

According to a disclosed embodiment, excluding permissions may include excluding a permission that was included in the permission policy corresponding to the first identity.

According to a disclosed embodiment, the analysis of the information may occur for a defined but adjustable duration of time.

According to a disclosed embodiment, the historical information may describe a frequency with which a particular action was taken by the first identity with respect to a particular network resource.

According to a disclosed embodiment, the operations may further comprise determining a least-privilege score for the first identity.

According to a disclosed embodiment, the least-privilege score may be developed based on a proportion of the particular actions taken with respect to the particular network resources to the permission policy corresponding to the first identity.

According to a disclosed embodiment, the operations may further comprise determining an overall least-privilege score for the plurality of identities.

According to a disclosed embodiment, the operations may further comprise developing recommendations, based on the analysis of the information, for excluding permissions from the permission policy corresponding to the first identity.

According to a disclosed embodiment, the operations may further comprise identifying a request by the first identity that violates the least-privilege profile for the first identity, and inquiring, to a source external to the first identity, whether the first identity is permitted to take an action corresponding to the request.

According to a disclosed embodiment, the operations may further comprise, if the first identity is not permitted to take the action corresponding to the request, modifying a network credential associated with the first identity.

According to another disclosed embodiment, a method may be implemented for developing and enforcing least-privilege policies in a network environment. The method may comprise identifying permission polices corresponding to a plurality of identities in a network environment, the permission polices specifying what types of actions the plurality of identities are permitted to take with respect to particular network resources. The method may also comprise analyzing information describing activity associated with a first identity from the plurality of identities in the network environment, the activity including particular actions with respect to particular network resources. Further, the method may comprise automatically developing, based on the analysis of the information, a least-privilege profile for the first identity, the least-privilege profile including permissions corresponding to the particular actions with respect to the particular network resources and excluding permissions that do not correspond to the particular actions with respect to the particular network resources. In addition, the method may comprise and enforcing the least-privilege profile for the first identity.

The activity may be associated with the first identity on at least one of the bases of the activity is historical activity of the first identity, the activity is identified based on source code of an application associated with the first identity, or the activity is associated with a second identity determined to be similar to the first identity. The enforcement may include at least one of permitting the first identity to take actions based on the included permissions, disallowing the first identity to take actions based on the excluded permissions, conditioning the ability of the first identity to take actions based on the excluded permissions, or simulating an application of the least-privilege profile based on actions taken by the first identity.

According to another disclosed embodiment, the method may further comprise automatically generating a permissions matrix to enable visualization of the least-privilege profile for the first identity.

According to another disclosed embodiment, the permissions matrix may include a plurality of rows and columns, at least one of the rows or columns identifying possible types of actions.

According to another disclosed embodiment, the permissions matrix may include a plurality of rows and columns, at least one of the rows or columns identifying network resources in the network environment.

According to another disclosed embodiment, the permissions matrix may identify privilege scores for the plurality of identities.

According to another disclosed embodiment, the permissions matrix may be color-coded such that different colors represent different categories of the privilege scores.

According to another disclosed embodiment, the method may further comprise enabling an administrator identity to exclude permissions from the permission polices corresponding to the plurality of identities.

According to another disclosed embodiment, may further comprise awarding points to the administrator identity when the administrator identity excludes permissions from the permission polices corresponding to the plurality of identities.

According to another disclosed embodiment, may further comprise awarding points to a plurality of administrator identities when the plurality of administrator identities exclude permissions from the permission polices corresponding to the plurality of identities.

According to another disclosed embodiment, may further comprise tracking the points of the plurality of administrator identities to enable competition among the plurality of administrator identities.

According to another disclosed embodiment, may further comprise tracking the points of the plurality of administrator identities to determine performance levels of the plurality of administrator identities.

According to another disclosed embodiment, may further comprise tracking the excluded permissions to identify trends in what types of permissions are excluded.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome many drawbacks of implementing permissions policies consistent with the principle of least-privilege (POLP) in a network environment. The described privilege management system may automate privilege management in addition to providing incentives for maintaining a privilege management system consistent with the POLP. Implementing a least-privilege management system improves network security by making the network less susceptible to attacks and by minimizing the access of the attacker, should an attack occur.

Reference will now be made in detail to the disclosed embodiments, examples of which are illustrated in the accompanying drawings.

Described herein are systems and methods for developing and enforcing a privilege management system in a network environment. Network environments may include access-restricted network resources, e.g., databases storing sensitive data, software development environments, restricted-use applications, web servers, etc. The POLP provides that an identity in a network environment should only have access to those network resources required for the identity to carry out its allowed functions. The POLP means that each identity in a network environment should run with as few privileges as possible. Advantages of implementing the POLP include increased security, minimized attack surface, minimized malware propagation, and better stability. For example, implementing the POLP in a network environment increases the environment's security against attacks and, if an attack occurs, limits the access of the attacker or malware to network resources.

Figure 1:
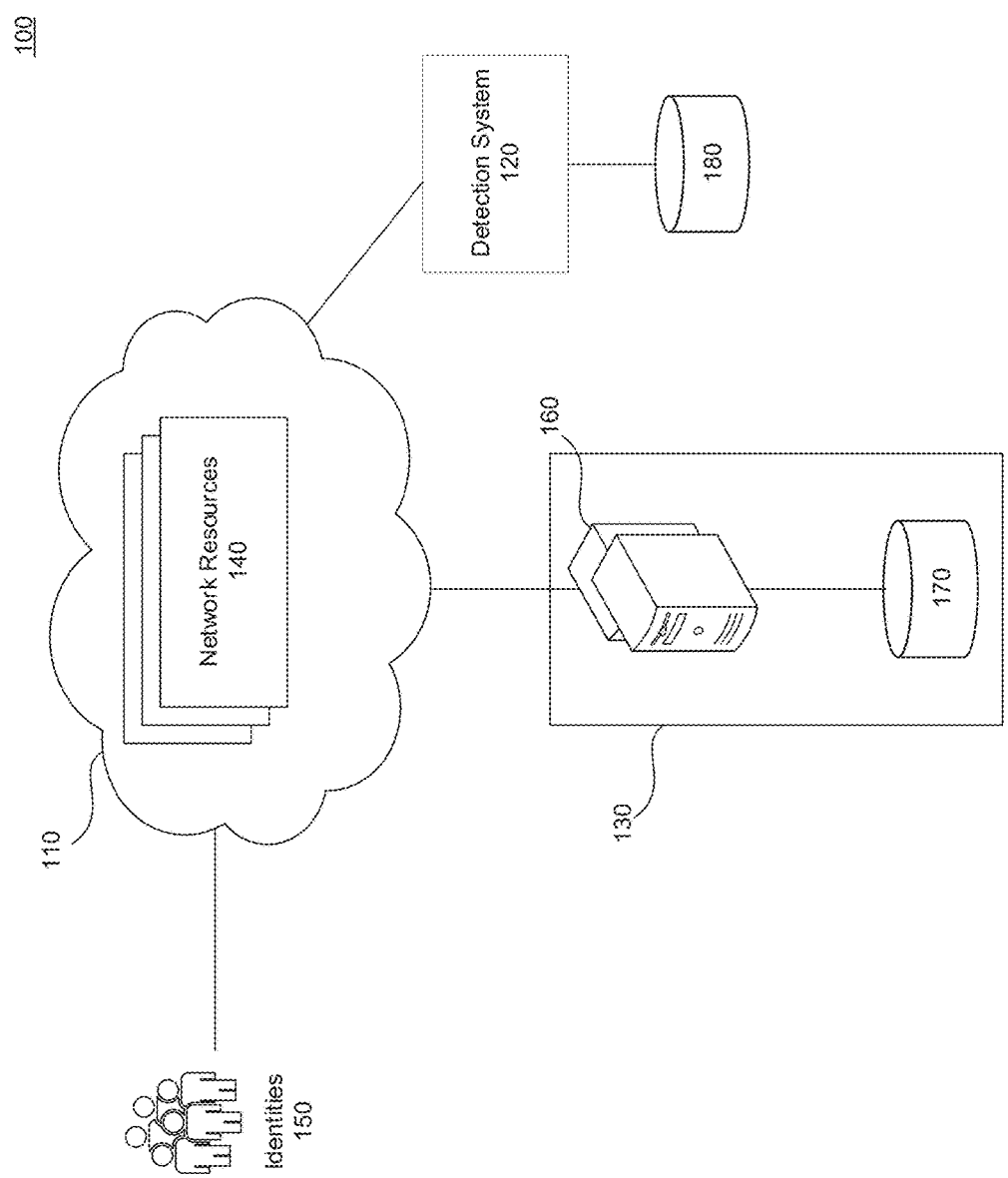
FIG. 1 is a block diagram of an example system in accordance with disclosed embodiments.

FIG. 1 depicts an exemplary system 100 for discovering and evaluating privileged identities, consistent with disclosed embodiments. System 100 can include network environment 110, detection system 120, and privilege management system 130. Network environment 110 can be configured to host network resources 140 and may be accessible to one or more identities 150. Privilege management system 130 may include one or more servers 160 and database 170. Detection system 120 may also include one or more databases 180.

System 100 can be configured to perform an iterative determination of entity privileges, consistent with disclosed embodiments. Based on this determination, system 100 can be configured to provide privilege information. In some aspects, system 100 can be configured to take remedial action. System 100 can be configured to discover and evaluate privileged entities automatically. For example, system 100 can discover and evaluate privileged entities without additional user interactions following configuration. As would be appreciated by one of skill in the art, the particular arrangement of components depicted in FIG. 1 is not intended to be limiting. Consistent with disclosed embodiments, system 100 can include additional components, or fewer components. For example, system 100 can include additional detection system, directory servers, authentication servers, or other computing devices.

Network environment 110 can include a cloud-computing platform, consistent with disclosed embodiments. Examples of suitable cloud-computing platforms include, but are not limited to, MICROSOFT AZURE, AMAZON WEB SERVICES (AWS), GOOGLE CLOUD PLATFORM, IBM CLOUD, and similar systems. Network environment 110 can be configured to associate permissions with entities deployed to network environment 110. As a non-limiting example, when network environment 110 is AWS, network environment 110 can use AWS IDENTITY AND ACCESS MANAGEMENT (IAM) to define permissions for entities deployed to network environment 110.

Network environment 110 may include one or more network resources 140. A network resource 140 may be any secure device, application, database, and/or network that requires an identity (e.g., identity 150) to be authenticated before accessing the resource. Network resources 140 may be, for example, a database, a server, an IoT device, a personal computing device, a smartphone, a vehicle infotainment system, computer-embedded clothing, a building, an automated teller machine (ATM), a website, a mobile application, or various other types of network-accessible resources. In some embodiments, network resources 140 may require authentication, such as through the use of a privileged credential (e.g., password, SSH key, symmetric (e.g., public/private) key, or other type of cryptographic data or privileged access token).

An identity 150 may be any account, person, machine, IoT device, application, or entity attempting to access a resource, such as a database, server, storage device, another identity, etc. in the network environment 110. In some embodiments, identity 150 may be an automated and/or computerized entity. For example, a computerized entity may be a scheduled backup service, task, etc. performed by one or more processors or systems. Identity 150 may be, for example, a local account on a computer or computer system that is established according to a particular operating system (e.g., Microsoft Windows®, Mac OS®, UNIX, etc.), a particular security service, or another service or protocol governing the computer or computer system. Identity 150 may also be a network account, such as an account established according to a network operating system (e.g., a Microsoft® network operating system, a Cisco® network operating system, a Dell® network operating system, a Linux network operating system, etc.). Further, network account identities may be established based on network security protocols or services. In addition, identity 150 may be an instance of a virtual machine or container running in a cloud computing environment. Identity 150 may also be a token used to identify a particular computing resource, person, account, virtual machine, container, or other entity accessing a computer or network.

Detection system 120 can be configured to interact with network environment 110 to discover and/or evaluate privileged identities. In various embodiments, detection system 120 can be deployed to network environment 110, together with identities 150. In some embodiments, detection system 120 can be implemented using one or more computing devices differing from those implementing network environment 110 (as shown in FIG. 1). Detection system 120 can then be configured to retrieve information concerning the identities deployed to network environment 110 and the privileges associated with these identities. In some aspects, detection system 120 can be configured to generate a tamper-proof record of scanning results. Detection system 120 can be configured to store this record in a database (e.g., database 180) and to repeatedly, intermittently, or periodically compare scan results.

In some embodiments, detection system 120 can be configured to communicate with network environment 110 using an application programming interface. This application programming interface can be exposed by network environment 110. For example, the scan of network environment 110 can be based on a query to an application programming interface associated with a cloud network provider.

In some embodiments, detection system 120 can be configured to communicate with network environment 110 over a network. This network can include one or more wired and/or wireless networks. For example, this network may include a cellular network, a public land mobile network, a local area network, a wide area network, a metropolitan area network, a fixed telephone network, an intranet, the Internet, a fiber optic-based network, a Bluetooth network, a radio network, a near field network, or any other type of electronics communications network know to one of skill in the art.

Detection system 120 can be configured to operate automatically or in response to a user command or system command (e.g., a command issued by an application, an instance of an application, an API, a system call, etc.). As an example of automatic operation, detection system 120 can be scheduled to discover and evaluate privileged identities repeatedly, intermittently, or periodically. As an additional example, detection system 120 can be configured to perform real time detection. In such instances, detection system 120 can be triggered using a web hook (e.g., a CLOUD HOOK or a SERVERLESS CLOUD FUNCTION). The web hook can trigger detection system 120 upon creation of a new cloud identity. In such aspects, upon creation of the new cloud identity, detection system 120 can be configured to evaluate the privileges of the new identity.

Detection system 120 may store information in one or more databases 180. Detection system 120 may be communicatively connected to one or more database(s) 180. Database 180 may include one or more memory devices that store information and are accessed and/or managed through detection system 120. By way of example, database(s) 180 may include Oracle™ databases, Sybase™ databases, or other relational databases or non-relational databases, such as Hadoop sequence files, HBase, or Cassandra. The databases or other files may include, for example, identities and permission policies, network resources accessed by an identity, an identity's attempt to access a network resource, and the like. Systems and methods of disclosed embodiments, however, are not limited to separate databases. Database 180 may include computing components (e.g., database management system, database server, etc.) configured to receive and process requests for data stored in memory devices of database(s) 180 and to provide data from database 180.

System 100 may require identities 150 to have certain privileges to access and/or modify network resources 140, which are managed by privilege management system 130. Privilege management system 130 can be configured to generate information for managing permission policies associated with identities 150, consistent with disclosed embodiments. Privilege management system 130 can provide this information to network resources 140, or another component of system 100.

Privilege management system 130 can be configured to receive policy information concerning identity activity in network environment 110. In some embodiments, privilege management system 130 can be configured to receive policy information while generating information on privilege usage of one or more identities. For example, privilege management system 130 can be configured to provide a graphical user interface. By interacting with this graphical user interface, a user can provide, modify, or revoke identity permissions.

Privilege management system 130 may include one or more servers 160. A server 160 may take the form of a mobile computing device, general purpose computer, a mainframe computer, or any combination of these components. According to some embodiments, server 160 may comprise web server(s) or similar computing devices that generate, maintain, and provide web site(s) consistent with disclosed embodiments. Server 160 may be standalone, or it may be part of a subsystem, which may be part of a larger system. For example, server 160 may represent distributed servers that are remotely located and communicate over a network (e.g., network 110) or a dedicated network, such as a LAN.

Privilege management system 130 may store information in one or more databases 170. Privilege management system 130 may be communicatively connected to one or more database(s) 170. Database 170 may include one or more memory devices that store information and are accessed and/or managed through privilege management system 130. By way of example, database(s) 170 may include Oracle™ databases, Sybase™ databases, or other relational databases or non-relational databases, such as Hadoop sequence files, HBase, or Cassandra. The databases or other files may include, for example, records of permission policy modifications, identity activity in the network environment 110, or records of a privilege management user's changes to the privilege management system. Systems and methods of disclosed embodiments, however, are not limited to separate databases. Database 170 may include computing components (e.g., database management system, database server, etc.) configured to receive and process requests for data stored in memory devices of database(s) 170 and to provide data from database 170.

Network environment 110 can be configured to maintain permission policies, consistent with disclosed embodiments. These permission policies can be associated with or included in identities 150. Network environment 110 can be configured to maintain these permission policies as stored data and/or instructions. As a non-limiting example, the permission policies can be maintained in JSON objects and/or XML documents, according to formats known to one of skill in the art. In some aspects, permission policies can be assigned to an identity, for example by associating a policy defining permissions with the identity. In various aspects, a permission policy can be specified, referenced, or included in the definition of the identity. In some embodiments, a cloud permission policy can indicate an effect (whether the policy allows or denies an action), a list of one or more actions permitted or denied by the permission policy, or a list of one or more network resources upon which one of the listed actions can be performed. For example, when the network environment is AWS, a permission policy associated with a role can allow the role to perform a LISTBUCKET action on an AMAZON S3 bucket. As an additional example, another permission policy associated with a user can allow the user to assume this role. Then the user can perform the LISTBUCKET action on the AMAZON S3 bucket. The following non-limiting example depicts an exemplary permission policy as implemented by AWS:

{"Statement": {
"Effect": "Allow",
"Action": "s3:ListBucket",
"Resource": "arn:aws:s3:::example_bucket"
}}

As shown, this permission policy allows the action "listbucket" to be performed on the AMAZON S3 bucket "example_bucket".

Figure 2:
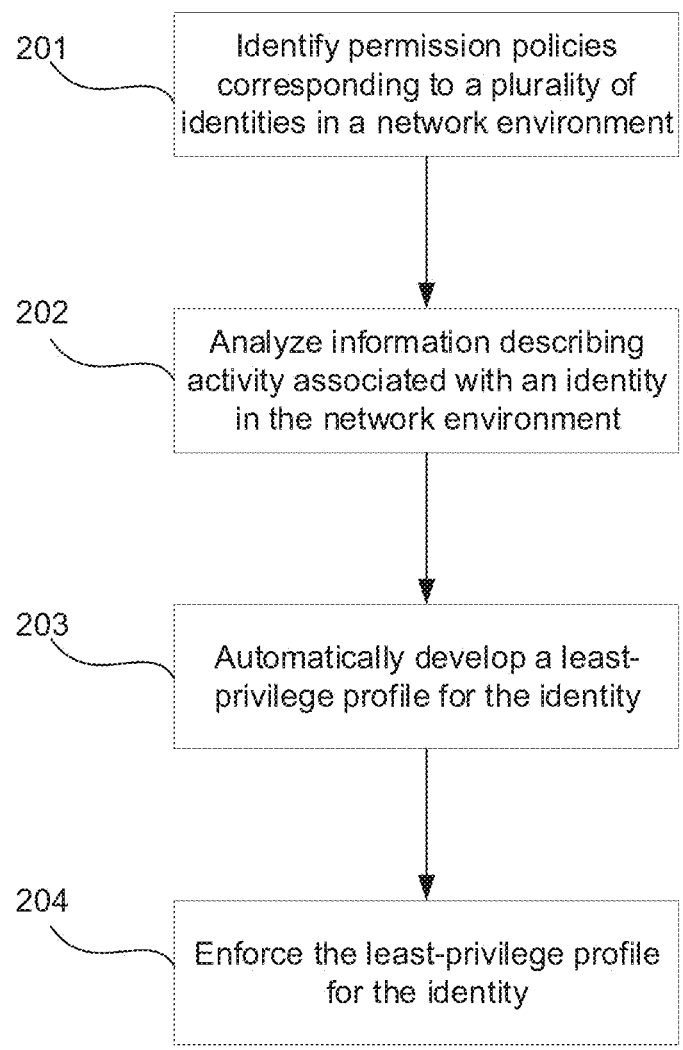
FIG. 2 is a block diagram depicting an example process for managing privileges in an example system in accordance with disclosed embodiments.

FIG. 2 depicts an exemplary method 200 for enforcing least-privilege policies in a network environment consistent with disclosed embodiments.

At step 201, a processor, e.g., a processor of server 160, identifies permission policies corresponding to a plurality of identities, e.g., identities 150, in a network environment, e.g., network environment 110. The permission policies may specify what types of actions the plurality of identities are permitted to take with respect to particular network resources, e.g., network resources 140. In some embodiments, identifying the permissions policies may include querying, via an API, an identity management service. For example, the processor may query an identity management service of network 110 or detection system 102 to retrieve permission policies associated with an identity.

At step, 202, the processor may analyze information describing activity associated with a first identity from the plurality of identities in the network environment. The activity associated with the identity may include particular actions with respect to particular network resources. The activity may be associated with the identity on the basis of, for example, the activity is a historical activity of the identity, the activity is identified based on source code of an application associated with the first identity, or the activity may be associated with another identity determined to be similar to the first identity. For example, this may involve identifying network resources that the identity has accessed in a specified time period (e.g., the last six hours, last day, last month, last six months, etc.). Further, a particular application to which the identity is allowed access may be analyzed. In some situations, the source code for the application may indicate certain network resources that the identity is permitted to access using the application. Further, the identity may be compared to other identities, such that the identity is classified in the same group as another similar identity. This may be based on, for example, a privilege classification of the identities, a creation time of the identities, roles of the identities, creators of the identities, functions of the identities, etc. Once a similar identity is identified, its activity may be associated with other identities sharing the similarity.

Historical activity of an identity may include records stored in database 108 containing information on an identity's actions in network environment 110 and an identity's attempts to access resources 140 in network environment 110. For example, historical information may describe a frequency with which a particular action was taken by the identity with respect to a particular network resource.

Analyzing the information may include one or more of machine learning analysis, statistical analysis, applying the information to an algorithm, or applying the information to a neural network. Additionally, in some embodiments, the processor may perform one or more steps to normalize and clean the information prior to analysis. In some embodiments, the analysis of the information may occur for a defined, but adjustable duration of time. For example, a user may adjust the duration of time, via a graphical user interface (GUI). The processor may analyze identity information collected in a particular week, month, year, etc.

At step 203, the processor may automatically develop, based on the analysis of the information, a least-privilege profile for the first identity. The least-privilege profile may include permissions corresponding to the particular actions with respect to the particular network resources and may exclude permissions that do not correspond to the particular actions with respect to the particular network resources. As discussed above, the actions may be based on a variety of sources, such as the actual activity of the identity, activity indicated by source code from an application associated with the identity, or activity of other identities deemed similar to the identity.

In some embodiments, the least-privilege profile for an identity may include a least-privilege score. The least-privilege score may be developed based on a proportion of the particular actions taken with respect to the particular network resources to the permission policy corresponding to the first identity. For example, an identity executing all actions permitted by the identity's permission policy may have a higher least-privilege score than an identity executing only a subset of their allowed actions.

In some embodiments, the processor may determine an overall least-privilege score for a group of several identities. An overall least-privilege score may enable an organization to evaluate its compliance with the POLP. For example, a low least-privilege score may alert an organization that associated identities have many unused permissions, resulting in a less secure network environment. An organization may be able to evaluate the relative effectiveness of its permissions management based on the overall least-privilege score. An organization may be able to implement a new permissions rule, for example, by restricting access to a certain network resource, and evaluating, based on changes in the least-privilege score, whether the new rule increased or decreased the security of the organization's network environment. Additionally, an organization may be able to publish its least-privilege score to enable potential customers or associates to evaluate its network security.

At step 204, the processor may enforce the least-privilege profile for the first identity. For example, enforcing the least-privilege profile may include permitting the first identity to take actions based on the included permissions, such as accessing network resources, performing actions in a network, accessing certain applications, modifying certain files, etc. It may also include disallowing the first identity to take actions based on the excluded permissions. Further, enforcing the least-privilege profile may include conditioning the ability of the first identity to take actions based on the excluded permissions. This may involve, for example, requiring the identity to authenticate itself, asking another identity (e.g., network administrator) to approve the actions, etc. In addition, enforcing the least-privilege profile may include simulating an application of the least-privilege profile to actions taken by the first identity. For example, once the least-privilege profile is created, a simulated enforcement of it may be created, to show how the least-privilege profile would operate in effect, while not actually operating to control activities of the identity. Simulating the operation of the least-privilege profile in this manner may assist system operators in analyzing and visualizing the impact of the least-privilege profile, which may further allow them to adjust or fine-tune the least-privilege profile or its enforcement.

In some embodiments, privilege management system 130 may enable administrator identities, e.g., administrators or other information technology (IT) professionals, to monitor, modify, and/or revoke permission policies via a GUI. Privilege management system 130 may construct and display a permissions matrix to an administrator identity, as discussed further below. For example, the processor may automatically generate a permissions matrix to enable visualization of the least privilege profile for an identity. Generating the permissions matrix may occur as a step of method 200. In some embodiments, the permissions matrix may be generated upon input from an administrator identity and may be available in a shared environment for interactive use by a plurality of administrator identities.

Method 200 may be repeated at predetermined intervals as required by the organization, or may be run continuously. In some embodiments, method 200 is executed as part of an application provided by privilege management system 130.

Figure 3:
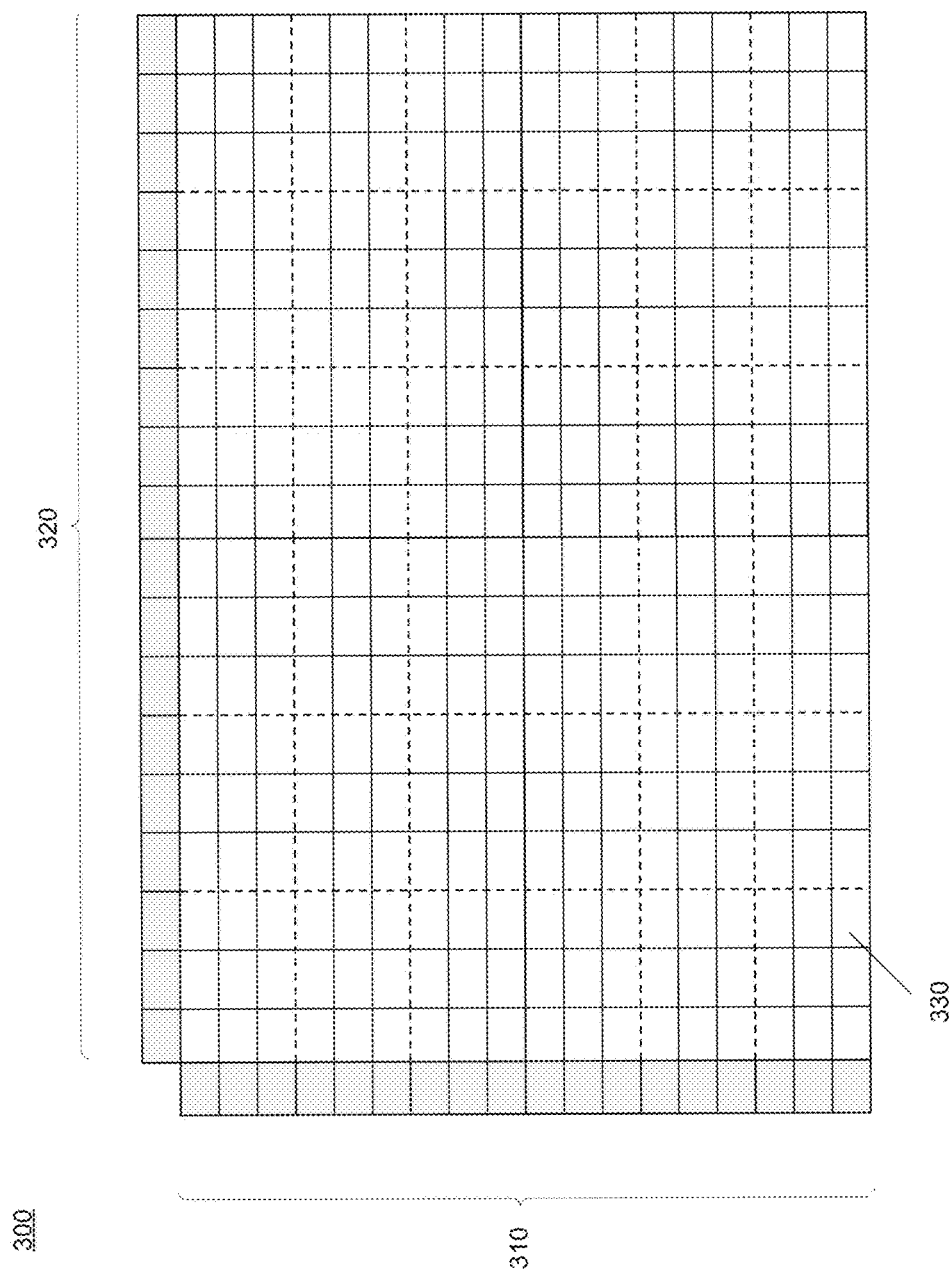
FIG. 3 is an example permissions matrix in accordance with disclosed embodiments.

FIG. 3 is an exemplary permissions matrix 300 that may be generated by a privilege management system, e.g., system 130. Current privilege management systems are not user friendly and only allow policies to be viewed in raw XML form. In some embodiments, the permissions matrix 300 may be displayed via GUI and may provide a visualization of identity privileges. By providing a visual summary of privilege information, permissions matrix 300 may enable IT professionals employed by an entity or entities to more effectively and efficiently implement a privilege policy. In some embodiments, permissions matrix 300 may be generated as an additional step of method 200.

The permissions matrix 300 may include a plurality of rows and columns, at least one of the rows or columns identifying possible types of actions. In some embodiments, at least one of the rows or columns identifies network resources in the network environment. For example, permissions matrix 300 may include rows 320 for various API actions and columns 310 for various targets, e.g., network resources, that the API actions can be performed on. A cell 330 in the permissions matrix represents a target-action pair, e.g., an action that may be performed on a specific target. For example, a target may be a database and rows 320 may represent actions that may be performed on the data base, e.g., read, write, delete, etc. Permissions matrix 300 may be general, for a specific identity, or may represent a group of identities.

Figure 4A:
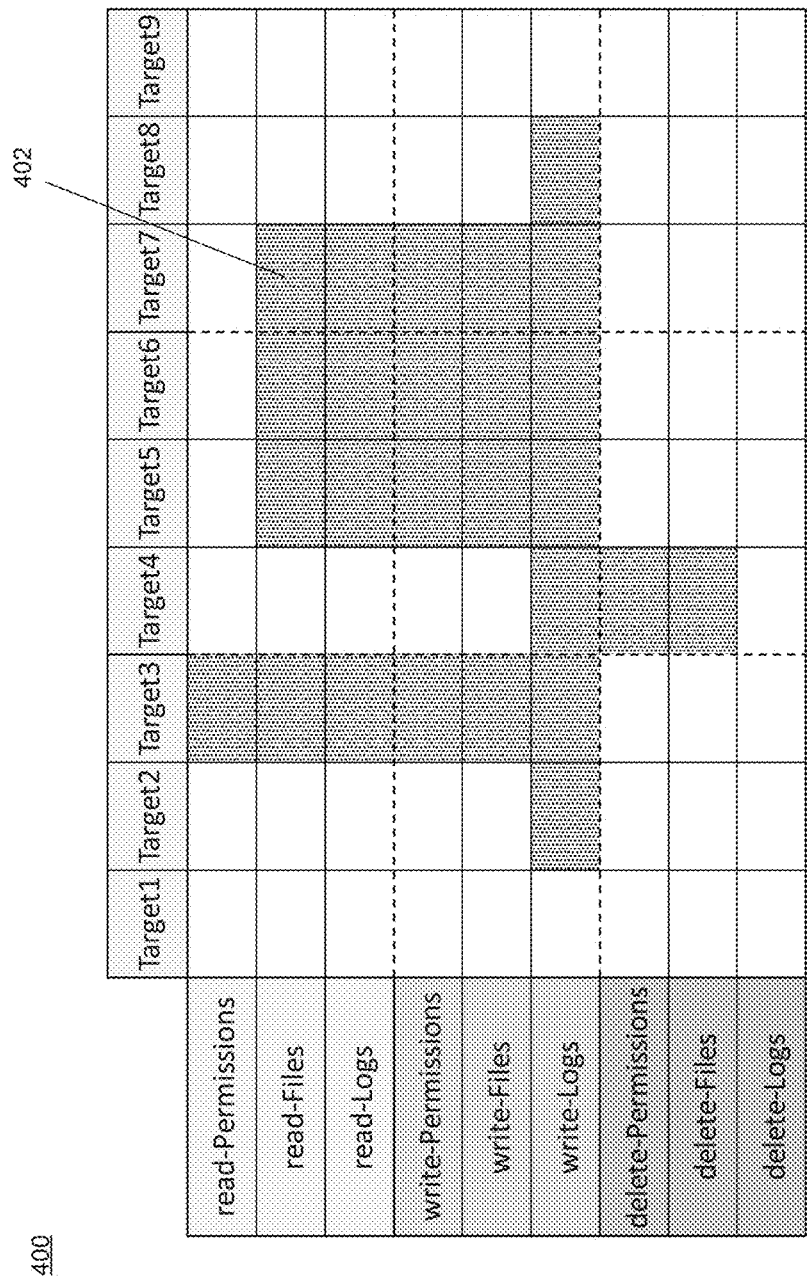
FIG. 4A is an example permissions matrix for an entity in accordance with disclosed embodiments.

FIG. 4A is an exemplary permissions matrix 400 for an entity. Permissions matrix 400 may be displayed in a GUI via a computing device. The privilege management system 130 may construct a permissions matrix 400 for an entity using historic logs of the permissions and usage of identities associated with the entity.

To build the permissions matrix, privilege management system 130 may query detection system 102 for all available identities and permissions for a given identity. In some embodiments, privilege management system 130 may query a cloud service using built-in API calls. For example, in AWS cloud environments, queries may include:

"ListUsers"—the AWS will respond back to the API caller the list of users in the current AWS environment.

"ListUserPolicies"—the AWS will respond with the inline permission policy for a given identity.

"GetUserPolicy"—the AWS returns the full JSON data of the permission policy for a given identity and policy name.

In some embodiments, the system 130 may normalize and aggregate permissions information for the identities associated with an entity to populate the entity permissions matrix 400.

Based on the historical data, each cell of the permissions matrix 400 may be populated. For example, shaded cells 402 represent permissions used by identities in the entity, while the blank cells represent unused permissions.

In some embodiments, data contained in the permissions matrix 400 may also provide trend analysis. For example, a GUI, e.g., GUI 404 represented in FIG. 4B, may display trend data and least-privilege scores for one or more organizations. This GUI may allow organizations to improve the effectiveness of their security policies. An organization may be motivated to reduce its least-privilege risk score by viewing least-privilege scores in different departments or sections of the organization. For example, least-privilege scores in a software development group may be compared to those in a web development group, and each group may compete with each other to improve their scores. Additionally, by providing information on the most used methods of privilege reductions among a number of departments or sections, an organization may be able to prioritize which methods to employ to reduce its least privilege score. In another embodiment, an organization may be able to view the average least-privilege score among departments and sections.

Figure 4B:
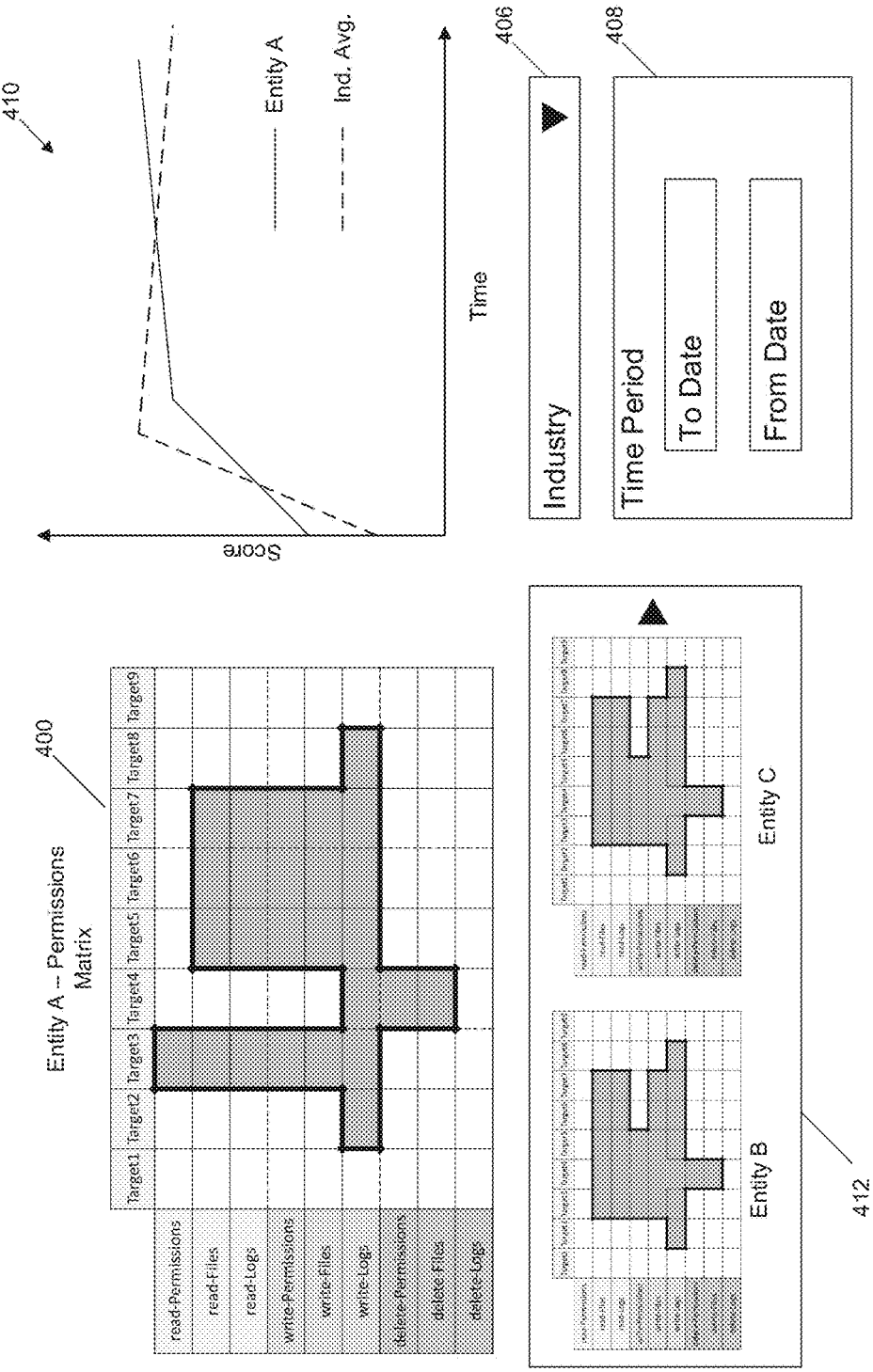
FIG. 4B is an example GUI in accordance with disclosed embodiments.

FIG. 4B shows an exemplary GUI 404 viewable by one or more users, e.g., IT professionals, belonging to Entity A. GUI 404 is an exemplary view of a dashboard displaying Entity A's permissions matrix 400, an industry selection bar 406, a date range selection window 408, a privilege score graph 410, and a menu of selectable thumbnails of other entities' permissions matrices 412. The GUI 404 may allow a user to select an industry, e.g., technology, finance, consulting, etc. Based on the selected industry, the system may populate the GUI 404 (menu 412 and graph 410) with data collected from departments or groups in the selected industry. A user may also further configure the view displayed in GUI 404 by selecting a time period using menu 408. Menus 406 and 408 may include drop-down menus, sliders, text input, or any other means for receiving user input in a computer environment.

Graph 410 may display Entity A's least-privilege score as a function of time against the average least-privilege score for a selected industry. Graph 410 may enable IT professionals and/or entity executives to view an overview of Entity A's progress compared to an industry or department average, yielding insights into what privilege policies are effective in raising the least-privilege score, what policies were not effective, how Entity A compares with other entities in the same industry, and the like. In some embodiments, graph 410 may be configured to display other metrics, such as, for example, security incidents over time, environment usage over time, number of permissions deleted over time, and the like. In some embodiments, an entity may opt-in or opt-out of data sharing.

Menu 412 may display thumbnail images of other entities' permissions matrices that are selectable by the user. Menu 412 may allow a user to view a specific entity's permissions matrix and compare that entity's matrix and least-privilege score directly with that of Entity A. A comparison of permissions matrices may yield insight into successful permissions policies and enable a user to implement a similar policy at Entity A. In some embodiments, organization information including, for example, entity name, may not be displayed to a user who is not associated with that entity, thus ensuring information privacy among organizations or departments.

In some embodiments, the data required to analyze and display least-privilege scores of one or more organizations (e.g., graph 410) may be stored in a separate database, inaccessible to each organization. Data may provide information on an organization's permission usages. In some embodiments, the database does not store information identifying the organization, e.g., IP addresses, or its identities. Data may include, for example, how many identities the organization has, how many permission squares in the permission matrix each of the identities has, and/or the modified and revoked permission squares by the organization. Other stored data may include organization size, industry, geographic location, etc. Analysis of such data may provide insights such as, for example, the average least-privilege risk score in other departments or organizations, the most frequently removed permissions, the average permission reduction rate among organizations, the average least-privilege improvement for a particular industry, etc.

Figure 5A:
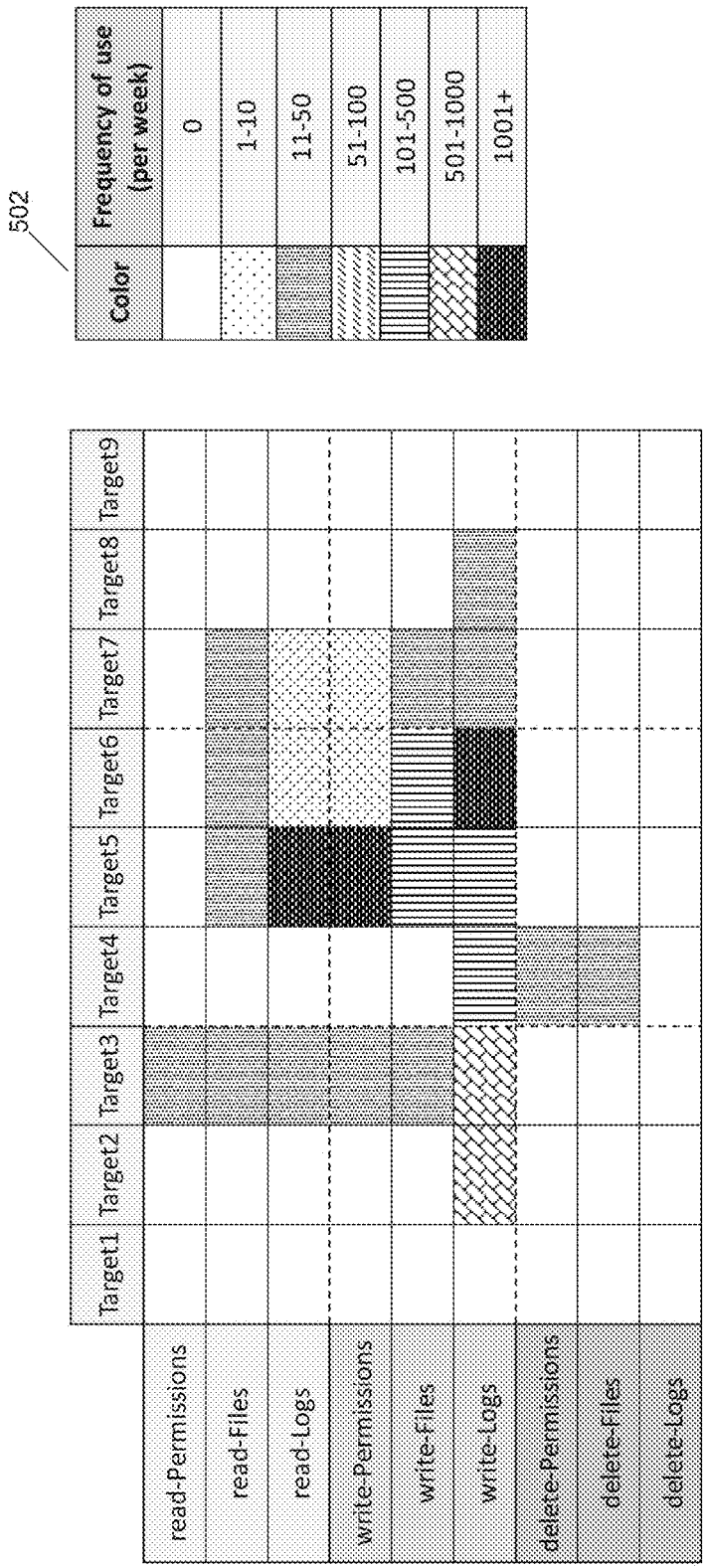
FIGS. 5A-5C are example permissions matrices in accordance with disclosed embodiments.

FIG. 5A is an exemplary permissions matrix 500 for an identity associated with an entity. Each cell of the permissions matrix 500 may identify the frequency of use of each target-action pair for a given period of time. Permissions matrix 500 may be populated using historical data from detection system 102 or another database. In some embodiments, the heat map may be color-coded such that different colors represent different frequencies of use, as shown by key 502. For example, permissions matrix 500 indicates that the identity uses its permission to delete files of Target4 11-50 times per week. The heat map displayed by permissions matrix 500 provides the user with an overview of how an identity is using its permissions, enabling the user to make decisions about whether a permission should be deleted or modified consistent with the entity's privilege policies and POLP.

In some embodiments, the matrix 500 may be color-coded by risk level, such that, for instance, cells appear darker red when representing a lower least-privilege score and green when representing a higher least-privilege score. In other embodiments, one or more icons may be displayed in each cell corresponding to different least-privilege scores. For example, a cell with a low score beneath 20 may display a red dragon icon, a cell with a score between 20 and 40 will display a yellow wolf, and a cell with a score above 80 will display a green puppy icon. Therefore, when an administrator identity views the least-privilege scan results in the permissions matrix 500 format, the risky action-target pairs will be clear against the others, this improving accuracy and efficiency of administrator identities.

In some embodiments, the permissions matrix 500 may display data for a single identity, a group of identities, or all identities in an organization. Thus, for example, an administrator identity may be able to zoom into and out of a permissions matrix, via a GUI, to view the heat map at different levels. For example, the permissions matrix 500 may identify privilege scores for the plurality of identities associated with a network environment. In this example, the permissions matrix 500 may be color-coded such that different colors represent different categories of the privilege scores.

Figure 5B:
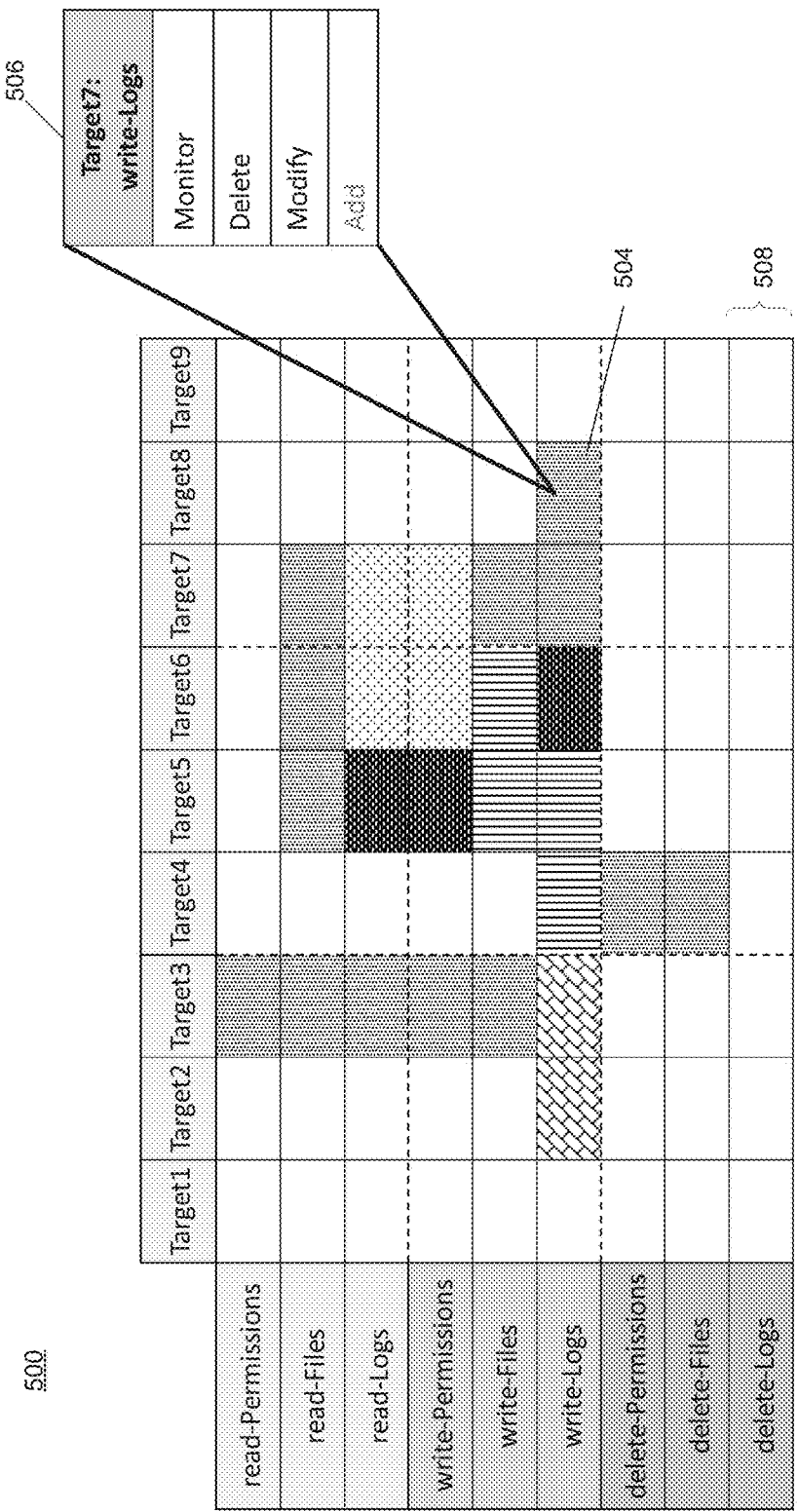

In some embodiments, a user, e.g., an administrator identity, may use the permissions matrix 500 to enforce or to modify permissions. FIG. 5B is an exemplary view of permissions matrix 500. A user may be able to select a cell, e.g., cell 504. In response to the cell selection, the GUI may display a menu 506 of one or more selectable actions. For example, menu 506 may enable to user to monitor, delete, and/or modify the identity's write-Logs permissions for Target8. If the identity does not have any existing permission policies for a target-action pair, the menu 506 may enable the user to add permissions for that identity.

In another exemplary embodiment, privilege management system 130 may enable an administrator identity to exclude permissions from the permission policies corresponding to the plurality of identities. For example, the administrator identity may identify, via permissions matrix 500, that an identity has not used any permissions pertaining to deleting logs. Thus, the administrator may select the row "delete-Logs" 508 and be prompted, via the GUI, to remove the identity's delete logs permissions.

In another example, the administrator and/or system may implement a threshold minimum number of uses per week for an identity to retain permissions to execute the action for a particular target. For example, a threshold may be 50 uses per week. Applying this threshold to permissions matrix 500, the administrator may remove 70 of the identity's 81 permissions such that the identity only retains permissions for the action-target pairs executed 51 or more times per week. In some embodiments, privilege management system 130 may automatically remove those permissions not meeting the threshold frequency of use automatically. In some embodiments, privilege management system 130 may be configured to automatically remove under-used privileges once per week, month, quarter, etc. or at any other interval programmable by the administrator.

Figure 5C:
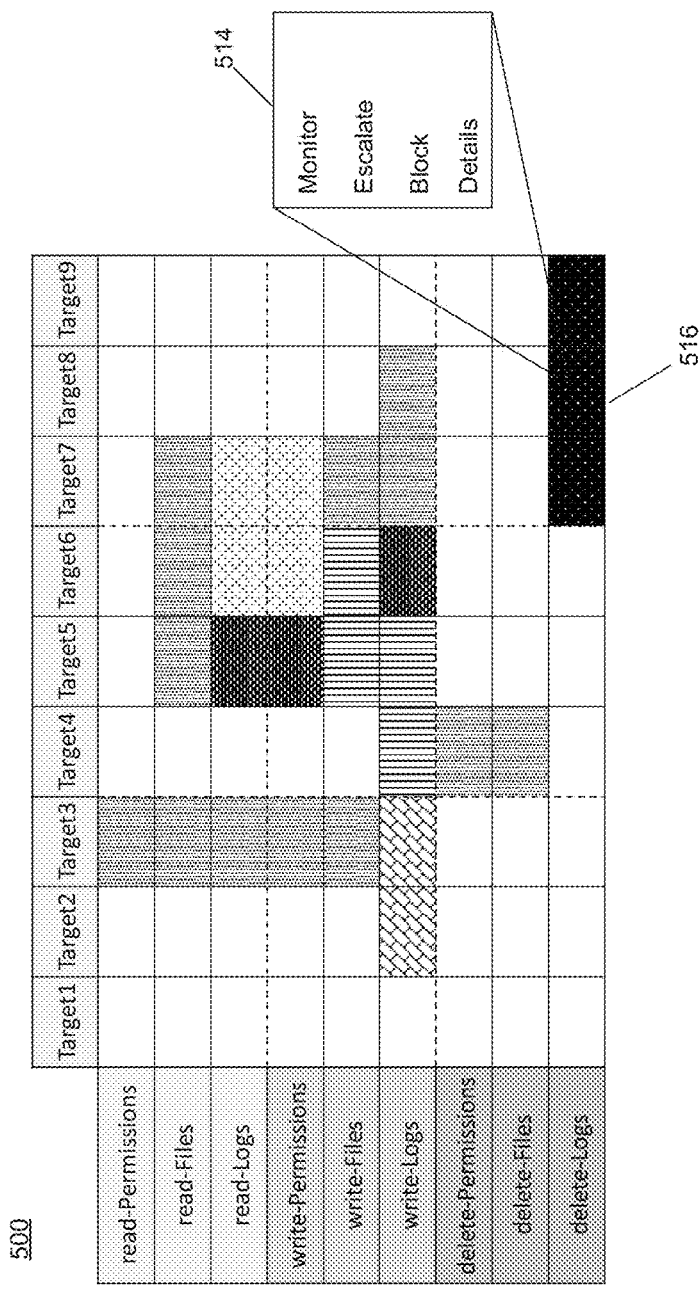

As shown in FIG. 5C, the privilege management system 130 may flag a detected attack. For example, the identity associated with matrix 500 may attempt to execute an action that violates its least-privilege policy. System 130 may display, via permissions matrix 500, what actions the identity attempted to execute by marking those cells 516 in the matrix 500. In some embodiments, the processor may identify a request by the identity that violates the least-privilege profile for the identity, and inquire, to a source external to the identity, whether the identity is permitted to take an action corresponding to the request. For example, an external server may host an organization policy defining what constitutes a least-privilege violation and how to respond to it. In some embodiments, if the identity is not permitted to take the action corresponding to the request, the processor may modify a network credential associated with the identity thereby enabling the identity to access a resource. In other embodiments, the system 130 may prompt a user, via menu 514, to monitor the activity, escalate the violation to an administrator or security system, block the identity from accessing all of or a subset of resources in the environment, or view additional details of the violation including, for example, time and date, GPS location, IP address, network, etc.

In some embodiments, to increase enforcement of a POLP policy, privilege management system 130 may provide "gamification" of privilege management in an organization. For example, the privilege management system 130 may provide an incentive for an administrator identity to exclude permissions from the least-privilege profile of an identity. In some embodiments, the system may award points to the administrator identity excludes permissions from the permission policies corresponding to a plurality of identities. For example, an administrator identity may gain performance points for each removed permission. In another embodiment, the system may award points to a plurality of administrators, e.g., an IT team within an organization. Thus, administrator identities may compete or work towards goals, which improves the user experience of managing permissions and thus improves administrator identity engagement and adherence to the organization's security policy. The system may track the points of one or more administrator identities to determine performance levels of the administrator identity or identities. For example, administrator identities may be awarded incentives based on their performance levels.

Figure 6:
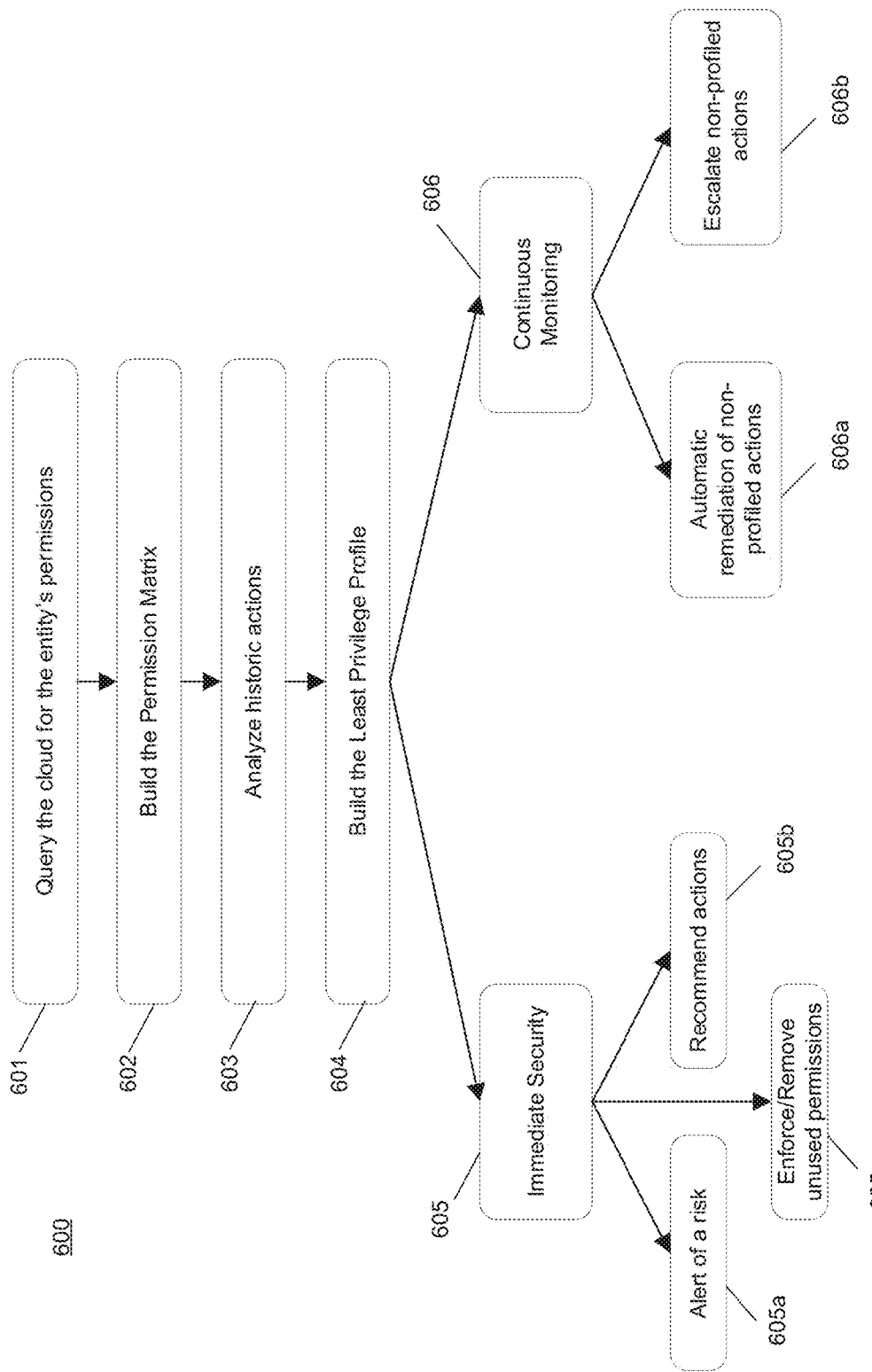
FIG. 6 is an example process flow diagram in accordance with disclosed embodiments.

FIG. 6 is an exemplary process flow 600 of least-privilege systems and methods described herein. At step 601, as previously described, system 130 may query a cloud or other network environment 110 and/or detection system 120 to retrieve historical data indicating the privilege policies and API calls of an identity. At step 602, system 130 may populate a permissions matrix for one or more identities associated with an entity, or the entity itself. For example, in addition to with or instead of step 201 of method 200, the system 130 may identify the permission policies associated with an identity by querying a permissions matrix associated with the plurality of identities. The permissions matrix may define the types of actions that the plurality of identities are permitted to take with respect to the particular network resources. The permissions matrix may be populated based on, for example, frequency of use or least-privilege score associated with a particular target-action pair as described with reference to FIGS. 4A and 5A-C.

At step 603, the system 130 may analyze the historical actions of the identity or identities to automatically identify privilege policies that require modification or deletion. In addition or alternatively, this may involve analyzing source code of an application associated with the identity, applying a least-privilege profile to the identity based on another identity deemed similar, or other techniques. At step 604, based on the analysis of the number of policies, the system 130 may build a least-privilege profile for the entity including a least-privilege score based, at least in part, on a proportion of the particular actions taken with respect to the particular network resources to the permission policy corresponding to the first identity.

Privilege management system 130 may engage in both immediate 605 and continuous 606 monitoring and security functions. For example, immediate security functionality 605 may include alerting a system or administrator to a risk 606a, recommending an action 606b based on a detected risk or analysis of an identity's privilege policy, and/or enforcing or removing unused permissions 606c. In some embodiments, the system may automatically monitor the actions of identities. For example, the system may use the available APIs to query and read activity logs containing the action that was taken and the resource that this action was performed on. In another embodiment, the system may monitor identities using "software agents" on the source machine of the identities which will monitor the identities' actions from their source machines of their actions. In another embodiment, the system may monitor actions by acting as a proxy in the communication between the source identities' machines and the target cloud service.

For example, privilege management 130 may automatically enforce the organization's permissions rules based on the permissions matrix 500. Based on information from the permission matrix, the system 130 may develop recommended actions, based on the analysis of the historical information associated with one or more identities. For example, a recommendation may be to remove or exclude unused permissions, as described above. Excluding permissions may include excluding a permission that was included in the permission policy of the identity. In addition, the system 130 may automatically modify or delete certain permissions based on the least-privilege score and/or historical activities of the identity.

Continuous monitoring functions 606 may include, for example, automatic remediation of non-profiled actions 606a and/or escalating non-profiled actions 606b. For example, as described with reference to FIG. 5C, the system 130 may identify attempted actions executed by an identity that are not included in that identities privilege profile. In response, the system 130 may block the non-profiled action and/or escalate the action by sending details of the action to a security system and/or administrator.

In some embodiments, the system may automatically analyze the monitored actions and mark those actions in the permission matrix of each corresponding identity. As previously described, the privilege management system 130 may generate a least-privilege score for one or more identities and recommend and/or implement modifications to permissions. The privilege management system 130 may track excluded, or removed, permissions to identify trends in what types of permissions are excluded. The privilege management system 130 may also record and store all modifications to permissions.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for developing and enforcing least-privilege policies in a network environment, the operations comprising:
   identifying permission policies corresponding to a plurality of identities in a network environment, the permission policies specifying what types of actions the plurality of identities are permitted to take with respect to particular network resources;
   analyzing information describing activity associated with a first identity from the plurality of identities in the network environment, the activity including particular actions with respect to particular network resources;
   wherein the activity is associated with the first identity based on at least one of:
   the activity is historical activity of the first identity;
   the activity is identified based on source code of an application associated with the first identity; or the activity is associated with a second identity determined to be similar to the first identity;

automatically developing, based on the analysis of the information, a least-privilege profile for the first identity, the least-privilege profile including permissions corresponding to the particular actions with respect to the particular network resources and excluding permissions that do not correspond to the particular actions with respect to the particular network resources; and enforcing the least-privilege profile for the first identity, the enforcement including at least one of:

permitting the first identity to take actions based on the included permissions;

disallowing the first identity to take actions based on the excluded permissions;

conditioning the ability of the first identity to take actions based on the excluded permissions; or simulating an application of the least-privilege profile to actions taken by the first identity.

2. The non-transitory computer readable medium of claim 1, further comprising automatically generating a permissions matrix to enable visualization of the least-privilege profile for the first identity.

3. The non-transitory computer readable medium of claim 2, further comprising making the permissions matrix available in a shared environment for interactive use by a plurality of administrator identities.

4. The non-transitory computer readable medium of claim 1, further comprising providing an incentive for an administrator identity to exclude permissions from the least-privilege profile for the first identity.

5. The non-transitory computer readable medium of claim 1, wherein identifying the permission policies includes querying, via an application programming interface, an identity management service.

6. The non-transitory computer readable medium of claim 1, wherein identifying the permission policies includes querying a permissions matrix associated with the plurality of identities, the permissions matrix defining the types of actions that the plurality of identities are permitted to take with respect to the particular network resources.

7. The non-transitory computer readable medium of claim 1, wherein excluding permissions includes excluding a permission that was included in the permission policy corresponding to the first identity.

8. The non-transitory computer readable medium of claim 1, wherein the analysis of the information occurs for a defined but adjustable duration of time.

9. The non-transitory computer readable medium of claim 1, wherein the historical information describes a frequency with which a particular action was taken by the first identity with respect to a particular network resource.

10. The non-transitory computer readable medium of claim 1, wherein the operations further comprise determining a least-privilege score for the first identity.

11. The non-transitory computer readable medium of claim 10, wherein the least-privilege score is developed based on a proportion of the particular actions taken with respect to the particular network resources to the permission policy corresponding to the first identity.

12. The non-transitory computer readable medium of claim 1, wherein the operations further comprise determining an overall least-privilege score for the plurality of identities.

13. The non-transitory computer readable medium of claim 1, wherein the operations further comprise developing recommendations, based on the analysis of the information, for excluding permissions from the permission policy corresponding to the first identity.

14. The non-transitory computer readable medium of claim 1, wherein the operations further comprise:

identifying a request by the first identity that violates the least-privilege profile for the first identity; and inquiring, to a source external to the first identity, whether the first identity is permitted to take an action corresponding to the request.

15. The non-transitory computer readable medium of claim 14, wherein the operations further comprise, if the first identity is not permitted to take the action corresponding to the request, modifying a network credential associated with the first identity.

16. A computer-implemented method for developing and enforcing least-privilege policies in a network environment, the method comprising:

identifying permission policies corresponding to a plurality of identities in a network environment, the permission policies specifying what types of actions the plurality of identities are permitted to take with respect to particular network resources;

analyzing information describing activity associated with a first identity from the plurality of identities in the network environment, the activity including particular actions with respect to particular network resources;

wherein the activity is associated with the first identity based on at least one of:

the activity is historical activity of the first identity;

the activity is identified based on source code of an application associated with the first identity; or the activity is associated with a second identity determined to be similar to the first identity;

automatically developing, based on the analysis of the information, a least-privilege profile for the first identity, the least-privilege profile including permissions corresponding to the particular actions with respect to the particular network resources and excluding permissions that do not correspond to the particular actions with respect to the particular network resources; and enforcing the least-privilege profile for the first identity, the enforcement including at least one of:

permitting the first identity to take actions based on the included permissions;

disallowing the first identity to take actions based on the excluded permissions;

conditioning the ability of the first identity to take actions based on the excluded permissions; or simulating an application of the least-privilege profile based on actions taken by the first identity.

17. The computer-implemented method of claim 16, further comprising automatically generating a permissions matrix to enable visualization of the least-privilege profile for the first identity.

18. The computer-implemented method of claim 17, wherein the permissions matrix includes a plurality of rows and columns, at least one of the rows or columns identifying possible types of actions.

19. The computer-implemented method of claim 17, wherein the permissions matrix includes a plurality of rows and columns, at least one of the rows or columns identifying network resources in the network environment.

20. The computer-implemented method of claim 17, wherein the permissions matrix identifies privilege scores for the plurality of identities.

21. The computer-implemented method of claim 20, wherein the permissions matrix is color-coded such that different colors represent different categories of the privilege scores.

22. The computer-implemented method of claim 16, further comprising enabling an administrator identity to exclude permissions from the permission policies corresponding to the plurality of identities.

23. The computer-implemented method of claim 22, further comprising awarding points to the administrator identity when the administrator identity excludes permissions from the permission policies corresponding to the plurality of identities.

24. The computer-implemented method of claim 16, further comprising awarding points to a plurality of administrator identities when the plurality of administrator identities exclude permissions from the permission policies corresponding to the plurality of identities.

25. The computer-implemented method of claim 24, further comprising tracking the points of the plurality of administrator identities to enable competition among the plurality of administrator identities.

26. The computer-implemented method of claim 24, further comprising tracking the points of the plurality of administrator identities to determine performance levels of the plurality of administrator identities.

27. The computer-implemented method of claim 16, further comprising tracking the excluded permissions to identify trends in what types of permissions are excluded.

* * * * *